Patented Sept. 2, 1952

2,609,325

UNITED STATES PATENT OFFICE 2,609,325

RECOVERY OF VITAMIN B$_{12}$ FROM LIVER

Norman G. Brink, Princeton, and Thomas R. Wood, Murray Hill, N. J., assignors to Merck & Co., Inc., Rahway, N. J., a corporation of New Jersey No Drawing. Application April 3, 1948, Serial No. 18,854

1 Claim. (Cl. 167—81)

This invention relates generally to the preparation of therapeutic materials and, more particularly, to the preparation of vitamin B$_{12}$ from liver.

Vitamin B$_{12}$ is a water soluble red colored crystalline compound containing carbon, hydrogen, oxygen, nitrogen, phosphorus, and cobalt. This vitamin derived from liver is valuable in the treatment of certain types of human anemias. It is a potent growth factor for the micro-organism *Lactobacillus lactis* Dorner.

It is an object of this invention to prepare vitamin B$_{12}$ in pure form from commercial liver preparations.

We have found that it is possible to subject commercial liver preparations to a purification process whereby vitamin B$_{12}$ is recovered possessing high physiological activity, particularly suitable for the clinical treatment of human anemia.

We have discovered that we can obtain vitamin B$_{12}$ in a concentrated and purified form from commercial liver preparations by a chromatographic technique. The purification and concentration is carried out under closely controlled conditions whereby the possibility of destruction or loss of the activity of the vitamin is reduced to a minimum.

According to the process of our invention we use as starting material a liver fraction of at least 1000 units per mg. which is prepared from commercially available preparations such as the 70% ethanol soluble fraction from an aqeous liver extract by the method such as that shown by Dakin and West in Jour. Biol. Chem. 109, 489 (1935).

The solid material thus obtained is chromatographed in aqueous solution on a column containing charcoal and the active material eluted with an organic solvent such as 50% ethanol. Other eluants such as 50% acetone, butanol-saturated water, benzyl alcohol-saturated water, and glacial acetic acid may also used.

Alternatively according to our preferred process, the alcoholic solution prepared by extraction of the solid material with a lower aliphatic alcohol is chromatographed on a column containing activated alumina and the active material eluted with methanol or aqueous methanol.

The eluates are collected in small fractions. The potency of the fractions is determined by microbiological assay by *Lactobacillus lactis* Dorner. The fractions of high potency are either dried, from the frozen state, or concentrated to a small volume.

Chromatographed material either solid or concentrated eluate such as that obtained from the alumina chromatogram is extracted with ethanol, and the ethanol-insoluble solids discarded. The ethanol solution is concentrated to dryness, and after dissolving the residue in methanol, acetone or ether is added to effect precipitation. The supernatant liquid is then discarded, the precipitate dissolved in water and the solution treated with acetone. The resulting precipitate is dissolved in methanol and several volumes of acetone are added. The supernatant liquid is discarded and the residue crystallized by solution in water and careful addition of acetone to turbidity. The resulting crystals are washed with acetone and recrystallized from water-acetone mixtures.

Alternatively, the vitamin B$_{12}$ concentrates, after the solvent-precipitation steps may be further purified by counter-current distribution between water and a mixture of 75% toluene-25% o-cresol, followed by crystallization of the best fractions.

If desired, the concentrates obtained by treatment with activated charcoal may be dissolved in a lower aliphatic alcohol and the resulting alcoholic solution may be chromatographed on a column of activated alumina.

The activity of the products is determined microbiologically by means of a growth response with *Lactobacillus lactis* Dorner as the test organism. An arbitrarily selected liver concentrate was accorded a value of 1000 units per mg.

A brief description of the assay method which we employed is given below.

*Lactobacillus lactis* Dorner has been reported to require two growth factors, T. J. and L. L. D. Medium modifications incorporated in the formula described below, have eliminated the requirement for the T. J. factor, and the assay as presented is specific for L. L. D. This micro-organism shows L. L. D. factor response to vitamin B$_{12}$. Pure crystalline vitamin B$_{12}$ is used as the assay standard and all unknowns evaluated in terms of microbiological growth-promoting activity, equivalent to the microbiological activity of vitamin B$_{12}$.

The organism, *Lactobacillus lactis* Dorner, A. T. C. C., 10, 697, used in this assay method is available in the American Type Culture Collection. Stock cultures of the organism are maintained on a growth medium which consists of:

1% Difco yeast extract
0.02% tomato juice serum
1% anhydrous dextrose
1.5% agar

The medium used for the inoculum consists of the basal or assay medium to which 1 unit per cc. of vitamin B$_{12}$ is added. The inoculum cells are washed with sterile distilled water and diluted to form a suspension which reads between 90% and 95% light transmission on the Evelyn photometer with a 520 mu filter.

The composition of the assay medium, double strength, is listed below. Ingredients may be conveniently dispensed from stock solutions:

| | | |
|---|---|---|
| DL isoleucine | mg | 200 |
| DL alpha-alanine | mg | 200 |
| DL aspartic acid | mg | 200 |
| DL valine | mg | 200 |
| DL methionine | mg | 200 |
| DL glutamic acid | mg | 200 |
| DL threonine | mg | 200 |
| DL serine | mg | 200 |
| DL phenylalanine | mg | 200 |
| DL leucine | mg | 200 |
| L histidine | mg | 200 |
| DL tryptophane | mg | 400 |
| L arginine | mg | 200 |
| L lysine | mg | 100 |
| Aminoacetic acid | mg | 200 |
| L cystine | mg | 200 |
| DL norleucine | mg | 200 |
| L tyrosine | mg | 200 |
| Dextrose | gm | 10 |
| Sodium acetate | gm | 6 |
| Fumaric acid | gm | 0.5 |
| Sodium ethyloxalacetate | gm | 0.5 |
| Riboflavin | mcg | 200 |
| Calcium pantothenate | mcg | 200 |
| Thiamin HCl | mcg | 200 |
| Nicotinic acid | mcg | 200 |
| Pyridoxamine | mcg | 400 |
| Para-aminobenzoic acid | mcg | 40 |
| Biotin | mcg | 0.4 |
| $MgSO_4 \cdot 7H_2O$ | mg | 200 |
| NaCl | mg | 10 |
| $FeSO_4 \cdot 7H_2O$ | mg | 10 |
| $MnSO_4 \cdot 4H_2O$ | mg | 10 |
| $K_2HPO_4$ | mg | 500 |
| $KH_2PO_4$ | mg | 500 |
| Folic acid | mcg | 2 |
| Casein hydrolyzate | gm | 1.0 |

Water to 500 cc.

The basal medium is prepared by combining the amino acids, then adding dextrose, sodium acetate, fumaric acid, heating to dissolve, and immediately readjusting to pH 7. The sodium ethyloxalacetate and vitamins are then added, dissolved, and the solutions again adjusted to pH 7. Finally, the salts, folic acid and casein hydrolyzates are added, dissolved, and the pH adjusted to 6.6.

A water solution or suspension of the sample to be assayed is diluted so that the solution contains about 0.2 L. L. D. type units per cc. which is then added to the assay tubes in 0.5, 1.0, 1.5, 2.0, and 2.5 cc. amounts. All of the tubes are then adjusted to a volume of 2.5 cc. with water, 2.5 cc. of the basal medium added, and the tubes are finally plugged and sterilized by heating at 120° C. for 13 minutes. After cooling to room temperature, the tubes are inoculated with one drop of the standardized suspension of L. lactis and then incubated at 37° C. for 40 hours. After incubation, the tubes are titrated directly with 0.05 N sodium hydroxide to the blue green endpoint of bromthymol blue.

The activity of the sample may then be determined from the standard curve by the amount of sodium hydroxide required.

The standard curve is prepared with crystalline vitamin $B_{12}$. One milligram of pure crystalline $B_{12}$ contains $11 \times 10^6$ units. A stock solution is diluted and 0.0, 0.05, 0.1, 0.2, 0.3, 0.4, 0.6, 0.8, 1.0 and 2.0 units added to duplicate series of tubes. Water is added to adjust the volume to 2.5 cc. The procedure described above for the samples under assay is followed with the standard. Typical titration values for the standard series listed above are 1.5, 2.0, 2.7, 4.3, 5.7, 6.6, 7.5, 7.9, 8.0 and 8.4 respectively, in terms of milliliters of 0.05 N sodium hydroxide required to neutralize the acid produced per culture of L. lactis.

The following examples illustrate a method of carrying out the present invention, but it is to be understood that these examples are given by way of illustration and not of limitation.

EXAMPLE 1

One gram of a concentrate having a microbiological potency of 3200 units per mg. was dissolved in 10 ml. of water and chromatographed on a column containing 10 g. of activated charcoal, preferably acid-washed. The column was washed thoroughly with water and the active material then eluted with 50% ethanol. The eluate was collected as a series of fractions of about 10 ml. each. The fractions of highest potency, as measured by microbiological assay, were combined and dried from the frozen state. The dried material (115 mg.) had a microbiological potency of about 10,000 units per mg., representing a yield of about 50%.

EXAMPLE 2

A 6,000 unit/mg. concentrate (14.6 g.) containing a total of 87 million units was extracted three times by stirring for about 30 min. with 200 ml. of methanol. The combined extracts were passed through a column about 7.5 cm. in diameter containing 600 g. of activated alumina. When the last of this solution had enteerd the alumina, methanol was added and allowed to percolate through the column for development of the chromatogram. During this operation, a pink band moved down and through the column, leaving essentially all of the brown-yellow color of the original solution at the top of the column. The effluent was collected in a series of fractions, of which those showing the most pronounced microbiological activity and/or the most pronounced pink color were selected and combined for further operations. This solution, which contained by microbiological assay about 65 million units, was evaporated in vacuo at a temperature below 25° C. to a thin syrup. During the evaporation, the pH of the solution, which tends to rise, was maintained at about 6 to 7 by the addition of dilute (2.5 N) hydrochloric acid as necessary. The residue was finally dried at low pressure (1 mm. mercury) at room temperature.

EXAMPLE 3

245 mg. of red residue from the alumina chromatogram was extracted with 15 ml. of absolute ethanol, giving a 34 mg. colorless insoluble residue and a red solution. The red solution afforded 218 mg. of a red oil. The red oil was dissolved in 0.5 ml. of methanol and 25 ml. of acetone was added, when a red precipitate and yellow supernatant were obtained.

This precipitate (31 mg.) gave an assay value of 1 to 7 million units/mg., and had an absorption maximum at 3600 Å., E%=26.9. It was reprecipitated from water (0.75 ml.) by acetone (13 ml.). The resulting red oil, 12.8 mg., was again precipitated from methanol solution with acetone, without any further weight loss. The product showed absorption maximum at 3600 Å., $E\% = 51.1$.

About 12 mg. of this material was dissolved in 0.7 ml. of water and acetone (3–4 ml.) added to turbidity. The solution deposited clusters of dark red, needle-like crystals on standing overnight. After two days the mother liquor was removed and the crystals were washed with acetone and dried, yielding 2.0 mg. An additional 1.4 mg. of crystals was obtained from the mother liquor.

EXAMPLE 4

A 6.0 mg. portion of vitamin $B_{12}$ concentrate of Example 3 with an activity of about 1 to $2 \times 10^6$ u./mg. was fractionated in a ten plate countercurrent distribution with water and a 75% toluene : 25% o-cresol mixture mutually saturated as the two immiscible phases. Two milliliters of each phase was used per tube, and the lower (aqueous) phases were transferred. At the completion of the distribution, the products were displaced to the aqueous phases by addition of 8 ml. of chloroform per tube. The aqueous phases from tubes numbered 2 through 5 (tube 0 representing material not transported) were combined, washed with chloroform and lyophilized, yielding 1.1 mg. of red amorphous vitamin $B_{12}$ concentrate of $7 \times 10^6$ u./mg. microbiological activity.

This product was readily crystallized by solution in water and addition of acetone. The crystalline vitamin $B_{12}$ so obtained weighed about 0.6 mg.

EXAMPLE 5

A 3.2 mg. portion of once-crystallized vitamin $B_{12}$ from liver was dissolved in methanol, filtered, and the filtrate concentrated to dryness in vacuo. The residue was dissolved in 0.15 ml. of water and acetone (ca. 1 ml.) was added until the solution became turbid; the solution was seeded and allowed to stand overnight at room temperature. The crystals which had been deposited were separated from the mother liquor, washed with acetone, and dried. The yield was about 2 mg.

The recrystallized vitamin $B_{12}$ had, after drying in vacuo at 100° for two hours, an ultraviolet absorption spectrum in water characterized as follows:

| Max. | $E_1$ Percent |
|---|---|
| 2,780 | 119 |
| 3,050 | 68 |
| 3,230 | 59 |
| 3,610 | 187 |
| 4,060 | 28 |
| 5,200 | 56 |
| 5,480 | 59 |

The needle-like, birefringent crystals (sign of elongation, positive) have, after drying, the indices of refraction: $\alpha$, 1.616; $\beta$, 1.652; and $\gamma$, 1.664.

In the L. L. D. assay, a sample of recrystallized vitamin $B_{12}$ showed a value (corrected for weight loss in drying) of $11.2 \times 10^6$ u./mg. $\pm 0.6 \times 10^6$ u./mg. This corresponds to a half-maximal growth of *L. lactis* Dorner in the presence of 0.000013 $\gamma$/ml. of culture medium under the conditions used.

On the micro hot-stage, the recrystallized vitamin $B_{12}$ darkened to black at about 210–220°, but did not liquefy below 300°.

Vitamin $B_{12}$ concentrates obtained in accordance with this invention possess high therapeutic value in the treatment of certain types of human anemia such as Addisonian pernicious anemia and the like, thus the crystalline product has produced a positive hematological response in three patients following single intramuscular injections of 150, 6, and 3$\gamma$ respectively. Four patients receiving single injections of the amorphous concentrates containing 20,000 to 40,000 L. L. D. units gave strong or maximal hematological responses. One mg. of the crystalline material is equivalent to about $11 \times 10^6$ L. L. D. units and one $\gamma$ to about 11,000 units. The abbreviations used in Tables I and II have the following significance:

$RBC \times 10^6$ = red blood cells $\times 10^6$ per cu. mm.
Hgb. gm. = hemoglobin gm./100 cc.
Retics, percent = reticulocytes, percent.
Hct., percent = hematocrit volume percent of cells.
$WBC \times 10^3$ = white blood cells $\times 10^3$ per cu. mm.

Table I
AMORPHOUS LIVER CONCENTRATES
[Case A]

| Day | 0 | 6 | 14 | 23 | 29 | 42 | 119 |
|---|---|---|---|---|---|---|---|
| $RBC \times 10^6$ | 1.7 | ------ | 2.4 | 2.6 | 2.8 | 3.3 | 4.5 |
| Hgb. gm | 6.8 | ------ | 7.8 | 9.5 | 9.8 | 11.0 | 14.0 |
| Retics., percent | 2.4 | 20.0 | 1.5 | 1.0 | 13.6 | 1.1 | ------ |
| L. L. D. Units | $2 \times 10^4$ | ------ | ------ | $1.8 \times 10^5$ | ------ | ------ | ------ |

The patient went home on the 45th day and has received no treatment aside from that recorded.

Table II
RECRYSTALLIZED VITAMIN $B_2$

| Case | B | | | C | | | D | | | |
|---|---|---|---|---|---|---|---|---|---|---|
| Day | 0 | 5 | 14 | 23 | 0 | 5 | 14 | 0 | 5 | 9 | 15 |
| $RBC \times 10^6$ | 1.5 | ------ | 2.6 | 3.4 | 1.5 | ------ | 2.6 | 1.4 | ------ | ------ | 2.6 |
| Hgb. gm | 4.5 | ------ | 7.0 | 9.0 | 7.8 | ------ | 10.0 | 6.8 | ------ | ------ | 9.8 |
| Retics., percent | 0.5 | 27.0 | 2.0 | 0.5 | 2.8 | 26.0 | 3.1 | 2.8 | 10.2 | 4.0 | 2.6 |
| Hct., percent | 14.0 | ------ | 25.0 | 29.0 | 17.0 | ------ | 31 | 17 | ------ | ------ | 31 |
| $WBC \times 10^3$ | 9.0 | 25.0 | 9.0 | ------ | 2.3 | ------ | 5.8 | 4.2 | ------ | ------ | 8.1 |
| Vitamin $B_{12}\gamma$ | 150 | ------ | ------ | ------ | 6 | ------ | ------ | 3 | ------ | 50 | ------ |
| L. L. D. Units | $1.6 \times 10^6$ | ------ | ------ | ------ | $6.6 \times 10^4$ | ------ | ------ | $3.3 \times 10^4$ | ------ | $5.5 \times 10^5$ | ------ |

Vitamin $B_{12}$ is also capable of increasing the growth rate of chicks on a basal diet containing all known nutrients. For example, in one experiment a level of 0.000003% of the crystalline vitamin in the diet produced a response such that the average weight of the chicks after a 16-day feeding period was 124 g., compared to an average weight of 110 g. for the control group whose ration was not supplemented with vitamin $B_{12}$.

Modifications may be made in carrying out the present invention without departing from the spirit and scope thereof, and the invention is to be limited only by the appended claim.

We claim:

The process for recovering vitamin $B_{12}$ from a liver concentrate having an activity for *Lacto-* bacillus lactis Dorner in excess of 1,000 units per milligram which comprises passing a methanol solution of said concentrate over a column of activated alumina to adsorb said vitamin $B_{12}$, eluting said column with methanol, collecting the methanol eluate in successive fractions, retaining those fractions which have relatively high activity for Lactobacillus lactis Dorner and discarding the other fractions, recovering a concentrate containing vitamin $B_{12}$ in an enhanced state of purity from the retained fractions of the methanol eluate, purifying said vitamin $B_{12}$ concentrate by counter-current distribution between water and a mixture of ortho-cresol and toluene, displacing the active material to the water phase by adding chloroform, and precipitating the vitamin $B_{12}$ in crystalline form by treating the aqueous solution with acetone.

NORMAN G. BRINK.
THOMAS R. WOOD.

REFERENCES CITED

The following references are of record in the file of this patent:

UNITED STATES PATENTS

| Number | Name | Date |
|---|---|---|
| 2,134,256 | Laland | Oct. 25, 1938 |
| 2,175,014 | Booher | Oct. 3, 1939 |
| 2,202,307 | Booher | May 28, 1940 |

FOREIGN PATENTS

| Number | Country | Date |
|---|---|---|
| 250,230 | Great Britain | June 29, 1927 |
| 473,064 | Great Britain | Oct. 5, 1937 |
| 590,956 | Great Britain | Aug. 1, 1947 |

OTHER REFERENCES

Fantes: Proceedings of the Royal Society (1950), pages 592 and 596. 167–81 $B_{12}$.

Emery: Proceedings of the Biochemical Society, volume 40, (1946), page iv. 167–$B_{12}$.

Subbarow: New England J. of Med., Jan. 30, 1936, page 194.

Rosenberg: Chemistry and Physiology of the Vitamins (1942), pages 526, 527 and 528.

American Journal of Pharmacy, February 1936, page 57. 167–74.6.

Stanger: Journal of the American Chemical Society, October 1944, volume 66, pages 1621, 1622 and 1623. 167–74.6.

West: Journal of Biological Chemistry, volume 109, page 489 (1935).